(12) United States Patent
Muroi (10) Patent No.: US 10,686,169 B2
(45) Date of Patent: Jun. 16, 2020

(54) PACKAGING MATERIAL FOR SECONDARY BATTERY, SECONDARY BATTERY, AND METHOD FOR MANUFACTURING PACKAGING MATERIAL FOR SECONDARY BATTERY

(71) Applicant: Toppan Printing Co., Ltd., Tokyo (JP)

(72) Inventor: Yuki Muroi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 147 days.

(21) Appl. No.: 15/142,763

(22) Filed: Apr. 29, 2016

(65) Prior Publication Data

US 2016/0248054 A1    Aug. 25, 2016

Related U.S. Application Data

(63) Continuation of application No. PCT/JP2014/078921, filed on Oct. 30, 2014.

(30) Foreign Application Priority Data

Nov. 1, 2013  (JP) .................................. 2013-228339

(51) Int. Cl.
*H01M 2/02* (2006.01)
*B32B 27/32* (2006.01)
(Continued)

(52) U.S. Cl.
CPC ............. *H01M 2/0287* (2013.01); *B32B 7/12* (2013.01); *B32B 15/08* (2013.01); *B32B 15/085* (2013.01);
(Continued)

(58) Field of Classification Search
CPC ............. H01M 2/0287; H01M 2/0285; H01M 2/0292; B32B 7/12; B32B 15/08;
(Continued)

(56) References Cited

U.S. PATENT DOCUMENTS

2009/0181244 A1* 7/2009 Fukugami ............... B32B 27/08
428/336
2010/0015451 A1 1/2010 Suzuta
(Continued)

FOREIGN PATENT DOCUMENTS

CN    101589488 A    11/2009
CN    103098257 A    5/2013
(Continued)

OTHER PUBLICATIONS

Machine translation of JP 2005-103955, retrieved from <https://www.j-platpat.inpit.go.jp/web/all/top/BTmTopEnglishPage> on Jun. 13, 2018.*

(Continued)

*Primary Examiner* — Cynthia K Walls
(74) *Attorney, Agent, or Firm* — Foley & Lardner LLP (57) ABSTRACT

A secondary battery packaging material according to the present invention includes: a substrate layer having a first surface and containing polyester or polyamide; a metal foil layer laminated on the first surface of the substrate layer; an anti-corrosion treatment layer laminated on the metal foil layer; an adhesive layer laminated on the anti-corrosion treatment layer and containing two or more polyolefins; and a heat-sealable resin layer laminated on the adhesive layer. Of the two or more polyolefins, a first polyolefin having a highest melting temperature of the two or more polyolefins with a melting temperature of from not less than a heat-resistance imparting temperature to not more than a critical substrate layer thermal deterioration temperature; and of the two or more of polyolefins, and a second polyolefin having a lowest melting temperature of the two or more polyolefins with a melting temperature of from not less than a critical heat-resistance temperature to not more than a lamination temperature.

12 Claims, 4 Drawing Sheets

(51) Int. Cl.
  *B32B 27/36* (2006.01)
  *B32B 27/34* (2006.01)
  *B32B 7/12* (2006.01)
  *B32B 15/08* (2006.01)
  *B32B 15/088* (2006.01)
  *B32B 15/18* (2006.01)
  *B32B 15/085* (2006.01)
  *B32B 15/20* (2006.01)
  *B32B 15/09* (2006.01)

(52) U.S. Cl.
  CPC ............ *B32B 15/088* (2013.01); *B32B 15/09* (2013.01); *B32B 15/18* (2013.01); *B32B 15/20* (2013.01); *B32B 27/32* (2013.01); *B32B 27/34* (2013.01); *B32B 27/36* (2013.01); *H01M 2/0285* (2013.01); *H01M 2/0292* (2013.01); *B32B 2250/05* (2013.01); *B32B 2255/06* (2013.01); *B32B 2255/20* (2013.01); *B32B 2255/205* (2013.01); *B32B 2255/26* (2013.01); *B32B 2255/28* (2013.01); *B32B 2270/00* (2013.01); *B32B 2274/00* (2013.01); *B32B 2307/31* (2013.01); *B32B 2307/714* (2013.01); *B32B 2307/7265* (2013.01); *B32B 2457/10* (2013.01); *B65D 2585/88* (2013.01)

(58) Field of Classification Search
  CPC ......... B32B 27/36; B32B 27/34; B32B 27/32; B32B 2307/714; B32B 2457/10; B32B 2307/31; B32B 2307/7265
  See application file for complete search history.

(56) References Cited

U.S. PATENT DOCUMENTS

| | | |
|---|---|---|
| 2013/0149597 A1 | 6/2013 | Suzuta et al. |
| 2015/0322250 A1 | 11/2015 | Katsuno et al. |
| 2016/0185945 A1 | 6/2016 | Katsuno et al. |

FOREIGN PATENT DOCUMENTS

| | | | | |
|---|---|---|---|---|
| EP | 3 121 864 A1 | 1/2017 | | |
| JP | 2001-031926 | 2/2001 | | |
| JP | 2002-093385 A | 3/2002 | | |
| JP | 2004-296287 | 10/2004 | | |
| JP | 2005-103955 | * 4/2005 | ............ | H01M 2/02 |
| JP | 2006-147551 | 6/2006 | | |
| JP | 2010-092703 A | 4/2010 | | |
| JP | 2010-102935 | 5/2010 | | |
| JP | 2010-254361 | 11/2010 | | |
| JP | 2011-054563 A | 3/2011 | | |
| JP | 2011-161639 | 8/2011 | | |
| JP | 2012-079481 A | 4/2012 | | |
| JP | 2014-199761 A | 10/2014 | | |
| WO | WO-2013/125670 | 8/2013 | | |

OTHER PUBLICATIONS

Office Action issued in corresponding JP Patent application No. 2013-228339 dated Sep. 15, 2017.
Database WPI Week 201470, Thomson Scientific, London, GB, AN 2014-T28906, XP002770521.
Extended European Search Report dated Jun. 7, 2017 in European Patent Application No. 14858270.3.
Office Communication dated Aug. 8, 2017 in Korean Patent Application No. 10-2016-7012653.
International Search Report issued in PCT/2014/078921 dated Jan. 27, 2015.
Chinese Office Action dated Apr. 4, 2018 in corresponding application No. 2014800594084.
Chinese Patent Office, "Office Action," issued in connection with Chinese Patent Application No. 201480059408.4, dated Dec. 28, 2018.

* cited by examiner

PACKAGING MATERIAL FOR SECONDARY BATTERY, SECONDARY BATTERY, AND METHOD FOR MANUFACTURING PACKAGING MATERIAL FOR SECONDARY BATTERY

CROSS-REFERENCE TO RELATED PATENT APPLICATIONS

This application is a continuation application filed under 35 U.S.C. § 111(a) claiming the benefit under 35 U.S.C. §§ 120 and 365(c) of PCT International Application No. PCT/JP2014/078921 filed on Oct. 30, 2014, which is based upon and claims the benefit of priority of Japanese Application No. 2013-228339, filed on Nov. 1, 2013, the entire contents of them all are hereby incorporated by reference.

TECHNICAL FIELD

The present invention relates to a secondary battery packaging material, a secondary battery, and a method for manufacturing a secondary battery packaging material.

BACKGROUND

In recent years, rechargeable battery devices used for personal computers, mobile terminal devices such as mobile phones, video cameras, satellites, vehicles, and the like are actively developed. Such rechargeable battery devices include secondary batteries, such as lithium ion batteries that can be made ultra thin and can have a small size. As secondary battery packaging materials used for such batteries, laminated packaging materials are attracting attention. The laminated packaging materials are formed of multilayer films (having a configuration, for example, of substrate layer/first adhesive layer/aluminum foil layer/second adhesive layer/heat-sealable resin layer). Unlike metal cans conventionally used as containers, such laminated packaging materials formed of multilayer films have a light weight and high heat dissipation properties and can shapes can be freely selected, and therefore, are improved or even superior to metal cans.

Such laminated packaging materials are roughly classified into two types on the basis of the methods of preparing a second adhesive layer between an aluminum foil layer and a heat-sealable resin layer. In other words, the laminated packaging materials are roughly classified into ones having a dry lamination structure in which a second adhesive layer is prepared by means of a dry lamination method, and ones having a heat lamination structure in which a second adhesive layer is prepared by means of an extrusion lamination method.

Those secondary battery packaging materials which have a dry lamination structure can be simply manufactured by means of a dry lamination method commonly used in manufacturing packaging materials, for example. Therefore, the secondary battery packaging materials having a dry lamination structure generally have a short period of use, and thus are used for consumer-oriented applications, such as portable devices, which are desired to be at low cost.

On the other hand, the packaging materials having a heat lamination structure are manufactured through more complicated processes using an extrusion lamination method, for example. Thus, the packaging materials having a heat lamination structure generally have a longer period of use, and thus are used for industrial applications, such as electric vehicles, motorbikes and power assisted bicycles, which are desired to have high reliability.

As batteries using laminated packaging materials, two types of packaging modes are proposed for sealing battery contents. Battery contents include, for example, a positive electrode, a separator, a negative electrode, an electrolyte solution in which an electrolyte is dissolved, and tabs each formed of a tab lead and a tab sealant. The two modes are:

(1) Pouched type packaging modes in which a pouch is formed using a packaging material and battery contents are accommodated in the pouch.

(2) Embossed type packaging modes in which a packaging material is cold-molded to form a recess and battery contents are accommodated in the recess.

The embossed type packaging modes include a mode for more efficiently packaging contents by forming a recess in both of the packaging materials to be stuck to each other to increase an accommodation volume and thus increase the battery capacity. For example, there is a laminated type battery in which two packaging materials having a recess formed by cold molding are heat-sealed, with the battery contents being sandwiched between the recessed materials. The battery contents at least include a positive electrode, a separator, a negative electrode, an electrolyte solution in which an electrolyte is dissolved, and tabs each formed of a tab lead and a tab sealant.

Recently, laminated packaging materials are desired to have various properties, such as sealing properties, chemical resistance, deep drawing properties, water vapor barrier properties, heat resistance, and insulating properties. In particular, the currently used packaging materials having a dry lamination structure are desired to improve properties associated with long-term reliability, such as chemical resistance, heat resistance, and water vapor barrier properties, compared with the laminated packaging materials having a heat lamination structure.

For example, PTL 1 discloses a battery case packaging material including an oriented heat-resistant resin film layer as an outer layer, a non-oriented thermoplastic resin film layer as an inner layer, and an aluminum foil layer disposed between these layers. The non-oriented thermoplastic resin film layer is adhered to the aluminum foil layer via an adhesive layer that contains polyolefin having a carboxyl group and a polyfunctional isocyanate compound. Thus, the chemical resistance or moldability of the battery case packaging material is ensured.

CITATION LIST

Patent Literature

PTL 1: JP-A-2010-092703

SUMMARY OF THE INVENTION

Technical Problem

PTL 1 makes mention of chemical resistance and moldability, but does not mention heat resistance. For example, the second adhesive layer in a dry lamination structure uses components having lower melting temperature compared to the second adhesive layer in a thermal lamination structure. However, when such a second adhesive layer is used in a battery, and the temperature of the battery is increased to this melting point or greater, the second adhesive layer melts to problematically reduce strength.

In view of the problems set forth above, an object of the present invention is to provide a secondary battery packaging material having good chemical resistance, heat resistance of lamination strength, deep drawing properties, crack resistance in molding, and water vapor barrier properties of heat-seal end portions, and to provide a secondary battery that uses the secondary battery packaging material, and a method for manufacturing a secondary battery packaging material.

Solution to Problem

In order to attempt to improve on or even solve the problems, the present invention proposes the following means. A secondary battery packaging material according to a first aspect of the present invention is a secondary battery packaging material including: a substrate layer having a first surface and containing polyester or polyamide; a metal foil layer laminated on the first surface of the substrate layer; an anti-corrosion treatment layer laminated on the metal foil layer; an adhesive layer laminated on the anti-corrosion treatment layer and containing two or more polyolefins; and a heat-sealable resin layer laminated on the adhesive layer. Of the two or more of polyolefins, a first polyolefin having a highest melting temperature has a melting temperature of from not less than a heat-resistance imparting temperature to not more than a critical substrate layer thermal deterioration temperature; and of the two or more of polyolefins, a second polyolefin having a lowest melting temperature has a melting temperature of from not less than a critical heat-resistance temperature to not more than a lamination temperature.

In the first aspect, the heat-sealable resin layer may contain a third polyolefin; and the third polyolefin has a melting temperature of from not less than the heat-resistance imparting temperature to not more than the critical substrate layer thermal deterioration temperature.

In the first aspect, the first polyolefin may be contained in the adhesive layer at a ratio of from not less than a heat resistance imparting amount to not more than a critical low-temperature lamination amount; and the second polyolefin may be contained in the adhesive layer at a ratio of from not less than a low temperature lamination property imparting amount to not more than a critical heat-resistance amount.

In the first aspect, the first polyolefin may be any one of polybutenes, butene-ethylene copolymers, butene-propylene copolymers, butene-ethylene-propylene copolymers, and butene-α-olefin copolymers polymerized with one, or two or more of unsaturated carboxylic acids, anhydrides of the unsaturated carboxylic acids, and (meth)acrylic acid esters.

In the first aspect, the first polyolefin and the second polyolefin contained in the adhesive layer may be cross-linked by an imide bond.

In the first aspect, the adhesive layer may have a thickness of from not less than 1 µm to not more than 5 µm.

In the first aspect, the heat-sealable resin layer may have a thickness of from not less than 20 µm to not more than 90 µm.

A secondary battery according to a second aspect of the present invention includes the secondary battery packaging material according to the first aspect.

A method for manufacturing a secondary battery packaging material according to a third aspect of the present invention is a method for manufacturing a secondary battery packaging material including at least a metal foil layer, an anti-corrosion treatment layer, an adhesive layer, and a heat-sealable resin layer laminated in this order on a first surface of a substrate layer, including: applying a coating liquid onto the anti-corrosion treatment layer to form the adhesive layer, the coating liquid containing two or more polyolefins of which a first polyolefin with a highest melting temperature has a melting temperature of from not less than a heat-resistance imparting temperature to not more than a critical substrate layer thermal deterioration temperature, and a second polyolefin with a lowest melting temperature has a melting temperature of from not less than a critical heat-resistance temperature to not more than a lamination temperature (adhesive layer forming step).

In the third aspect, the method may include performing dry lamination after forming the adhesive layer to form the heat-sealable resin layer on the adhesive layer, the dry lamination being performed using a heat-sealable resin containing a third polyolefin having a melting temperature of from not less than the heat-resistance imparting temperature to not more than the critical substrate layer thermal deterioration temperature, at a temperature of equal to or more than the melting temperature of the second polyolefin but less than the melting temperature of the first polyolefin that is less than the melting temperature of the third polyolefin (heat-sealable resin layer forming step).

The method for manufacturing a secondary battery packaging material according to the third aspect may include performing aging treatment after forming the heat-sealable resin layer, the aging treatment being performed at a temperature of from not less than 20° C. to not more than 100° C., targeting the anti-corrosion treatment layer, the adhesive layer, and the heat-sealable resin layer (first aging step).

In the third aspect, the method may include heating the anti-corrosion treatment layer, the adhesive layer, and the heat-sealable resin layer after forming the heat-sealable resin layer, the heating being performed at a temperature ranging from not less than the melting temperature of the first polyolefin or not less than the melting temperature of the third polyolefin to not more than the critical substrate layer thermal deterioration temperature, followed by cooling to a temperature of less than a crystallization temperature of the adhesive layer that is less than a crystallization temperature of the heat-sealable resin layer (heating and cooling step).

In the third aspect, the method may include heating the anti-corrosion treatment layer, the adhesive layer, and the heat-sealable resin layer after subjecting the anti-corrosion treatment layer, the adhesive layer, and the heat-sealable resin layer to aging treatment, the heating being performed at a temperature ranging from not less than the melting temperature of the first polyolefin or not less than the melting temperature of the third polyolefin to not more than the critical substrate layer thermal deterioration temperature, followed by cooling to a temperature of less than a crystallization temperature of the adhesive that is less than a crystallization temperature of the heat-sealable resin layer (heating and cooling step).

In the third aspect, the method may include performing aging treatment after heating and cooling the anti-corrosion treatment layer, the adhesive layer, and the heat-sealable resin layer, the aging treatment being performed at a temperature of from not less than 20° C. to not more than 100° C., targeting the anti-corrosion treatment layer, the adhesive layer, and the heat-sealable resin layer (second aging step).

Advantageous Effects of Invention

According to the aspects of the present invention, a secondary battery packaging material and a secondary battery excellent in chemical resistance, lamination strength resisting to heat, deep drawing properties, crack resistant properties in forming, and water vapor barrier properties of heat-seal end portions can be obtained. According to the aspects of the present invention, a secondary battery packaging material excellent in chemical resistance, lamination strength resisting to heat, deep drawing properties, crack resistant properties in forming, and water vapor barrier properties of heat-seal end portions can be manufactured.

DESCRIPTION OF THE REPRESENTATIVE EMBODIMENTS

Referring to FIGS. 1 to 8, hereinafter will be described a secondary battery packaging material (hereinafter, also simply referred to as a packaging material) according to an embodiment of the present invention. However, it is not intended for the following description (and any description) to be limiting to a specific embodiment. The following description is to a representative embodiment of the present invention.

(Packaging Material)

The packaging material according to the present invention is a dry laminated packaging material applied to a storage battery.

Figure 1:
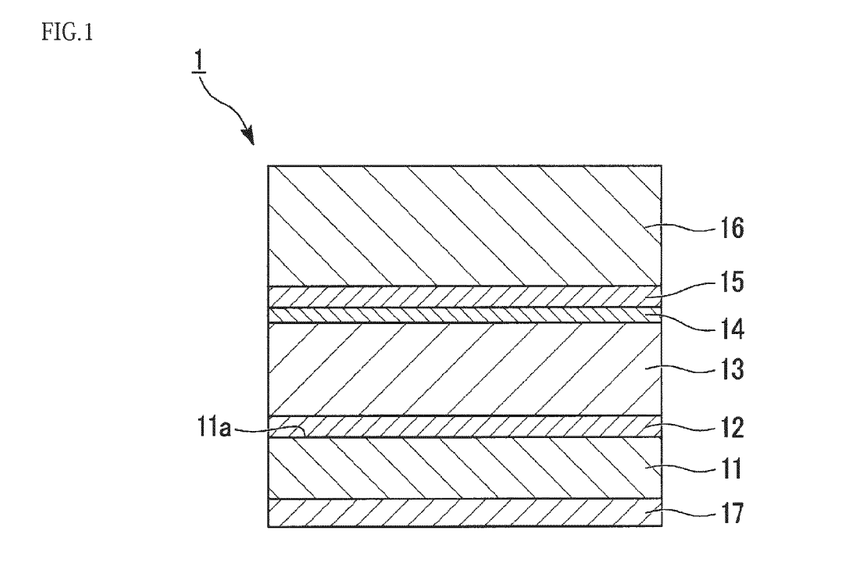
FIG. 1 is a side cross-sectional view illustrating an example of a secondary battery packaging material according to an embodiment of the present invention.

As illustrated in FIG. 1, a packaging material 1 according to the present invention includes a substrate layer 11 having one surface 11a on which a substrate adhesive layer 12, a metal foil layer 13, an anti-corrosion treatment layer 14, an adhesive layer 15, and a heat-sealable resin layer 16 are laminated in this order, and having one surface 11a on which a substrate adhesive layer 12, a metal foil layer 13, an anti-corrosion treatment layer 14, an adhesive layer 15, and a heat-sealable resin layer 16 are laminated in this order to form a laminate structure.

In the drawings, the thickness and dimensional ratio of components are differently illustrated as appropriate between the drawings, for the sake of clarity.

(Substrate Layer 11)

The substrate layer 11 plays a role of providing heat resistance in a sealing step in manufacturing a battery and trying to minimize creation of pin holes that can be produced in the course of processing or distribution. The substrate layer 11 plays a role of preventing the metal foil layer 13 from being broken in an embossing step, and establishing insulation, for example, that prevents the metal foil layer 13 from contacting other metal.

Films that can be used as the substrate layer 11 include, for example, oriented or non-oriented films such as of polyester, polyamide, and polyolefin. From the viewpoint of improving moldability, heat resistance, piercing resistance and insulating properties, biaxially oriented polyamide or biaxially oriented polyester is preferably used among them.

The substrate layer 11 may be formed of a single film, or may be a composite film formed of two or more films bonded with each other by means of a dry lamination adhesive.

When the substrate layer 11 is formed of a single film, films that can be used include a biaxially oriented polyamide film that is a single-layer film, or a biaxially oriented polyester film, or a biaxially oriented co-extrusion film, which is a multilayer film structured with polyamide/polyester thermoplastic elastomer/polyester. When the substrate layer 11 is a composite substrate film, there can be used a multilayer composite film having two films bonded with each other by a dry lamination adhesive, structured with biaxially oriented polyamide film/polyurethane adhesive/biaxially oriented polyester film.

Typically, a polyurethane adhesive used for bonding in a composite film has a low chemical resistance to hydrogen fluoride or electrolyte solution, and is decomposed in an atmosphere of these chemicals without being in direct contact with them. Thus, the adhesive may be deteriorated in a liquid-injection step, for example, in manufacturing a battery. Therefore, in the present embodiment, the substrate layer 11 is preferably configured of a single substrate using a polyester thermoplastic elastomer having good chemical resistance.

For the substrate layer 11, an additive, such as a fire retardant, slip agent, anti-blocking agent, antioxidant, light stabilizer, tackifier, or antistatic material, may be dispersed inside thereof, or may be coated onto a surface thereof.

Slip agents that can be used include fatty acid amides (e.g. oleic acid amide, erucic acid amide, stearic acid amide, behenic acid amide, ethylenebis-oleic acid amide, and ethylenebis-erucic acid), and the like.

As anti-blocking agents, various filler-based anti-blocking agents, such as silica, are preferably used. The additives may be used singly, or in combination of two or more.

From the viewpoint of piercing resistance, insulating properties, and processability in embossing, for example, the substrate layer 11 preferably has a thickness of 6 μm (micrometers) or greater but 50 μm or less, and more preferably 10 μm or greater but 40 μm or less. When the thickness of the substrate layer 11 is 6 μm or greater, pin hole resistance and insulating properties are improved, and when 50 μm or less, moldability is improved.

In order to improve abrasion resistance, slipperiness or the like, a concavo-convex configuration can be formed on the surface of the substrate layer 11.

(Substrate Adhesive Layer 12)

The substrate adhesive layer 12 is formed between the substrate layer 11 and the metal foil layer 13, i.e., on the one surface (first surface) 11a of the substrate layer 11. The substrate adhesive layer 12 has an adhesion force needed to firmly adhere the substrate layer 11 with the metal foil layer 13. The substrate adhesive layer 12 has followability to protect the metal foil layer 13 from being broken by the substrate layer 11 in embossing.

As the substrate adhesive layer 12, a two-liquid curing type adhesive can be used having a base resin that contains polyester polyol, polyether polyol, acrylic polyol, or the like, and a curing agent that contains an aromatic or aliphatic isocyanate. In the adhesive, a mol ratio of an NCO group of the curing agent to an OH group (or COOH group) of the base resin (NCO/OH (or COOH group)) is preferably 1 or greater but 10 or less, and more preferably 2 or greater but 5 or less. When (NCO/OH (or COOH group)) is 1 or greater, adhesiveness can be obtained. When (NCO/OH (or COOH group)) is greater than 10, the cross-linking reaction will excessively advance, the substrate adhesive layer 12 becomes more fragile and hard, and less or no stretching can be ensured. Thus, less or no moldability can be obtained.

A thermoplastic elastomer, tackifier, filler, pigment, dye, or the like can be added to the substrate adhesive layer 12.

From the viewpoint of adhesive strength, followability, processability, or the like, the substrate adhesive layer 12 preferably has a thickness of 0.5 μm or greater but 10 μm or less, and more preferably 1 μm or greater but 5 μm or less.

(Metal Foil Layer 13)

The metal foil layer 13 is formed between the substrate adhesive layer 12 and the adhesive layer 15, i.e., on a surface of the substrate adhesive layer 12 on the opposite side of the surface on which the substrate layer 11 is laminated. The metal foil layer 13 has water vapor barrier properties that prevent entry of moisture into a battery. The metal foil layer 13 has spreadability for deep-draw molding.

As the metal foil layer 13, various metal foils such as of aluminum and stainless steel can be used. From the viewpoint of weight (specific gravity), moisture resistance, processability, and cost, aluminum foil is preferable.

As the aluminum foil serving as the metal foil layer 13, any known soft aluminum foil can be used. From the viewpoint of pin hole resistance and spreadability in molding, an aluminum foil containing iron is preferable. The content of iron in an aluminum foil (100 mass %) is preferably 0.1 mass % or greater but 9.0 mass % or less relative to the total 100% aluminum foil, and more preferably 0.5 mass % or greater but 2.0 mass % or less. When the content of iron is not less than a lower limit (0.1 mass %), pin hole resistance and spreadability are improved. When the content of iron is not more than an upper limit (9.0 mass %), flexibility is improved.

From the viewpoint of barrier properties, pin hole resistance, and processability, the metal foil layer 13 preferably has a thickness of 10 μm or greater but 100 μm or less, and more preferably 15 μm or greater but 80 μm or less.

For the metal foil layer 13, untreated aluminum foil may be used, but it is preferable to use degreased aluminum. The degreasing treatment is roughly categorized into a wet type and a dry type.

The wet type degreasing treatment includes, for example, acid degreasing and alkali degreasing. Acids used for acid degreasing include, for example, inorganic acids, such as sulfuric acid, nitric acid, hydrochloric acid, and hydrofluoric acid. These acids may be used singly, or in combination of two or more. From the viewpoint of improving the etching effect of the aluminum foil, various metal salts serving as a supply source of iron (III) ions or cerium (III) ions, for example, may be formulated as necessary. Alkalis that can be used for alkali degreasing include, for example, strong etching type alkalis, such as sodium hydroxide. Weak alkalis or alkalis formulated with a surface active agent may be used.

The wet type degreasing treatment is performed by means of an immersion method or spraying method.

The dry type degreasing treatment includes, for example, a method in which an aluminum foil used for the metal foil layer 13 is subjected to annealing, with the annealing time being elongated. In addition to the degreasing treatment, the dry type degreasing treatment includes flame treatment or corona treatment. Other treatments that may be used are degreasing treatments in which contaminants are oxidized, decomposed and removed using active oxygen generated by irradiating ultraviolet rays of a specific wavelength.

(Anti-Corrosion Treatment Layer 14)

The anti-corrosion treatment layer 14 is formed on a surface of the metal foil layer 13 opposed to the heat-sealable resin layer 16, i.e., on a surface of the metal foil layer 13 on the opposite side of the surface on which the substrate adhesive layer 12 is laminated. The anti-corrosion treatment layer 14 better prevents the surface of the metal foil layer 13 from corroding due to hydrofluoric acid produced by reaction of an electrolyte with moisture.

The anti-corrosion treatment layer 14 better prevents corrosion and also serves as an anchor layer that improves the adhesiveness of the adhesive layer 15 with the metal foil layer 13.

For example, the anti-corrosion treatment layer 14 can be formed through chromate treatment using an anti-corrosion treatment agent containing a chromate, phosphate, fluoride, or various thermosetting resins, or through ceria sol treatment using an anti-corrosion treatment agent containing a rare earth oxide (e.g. ceric oxide), phosphate, and various thermosetting resins, or other treatment. Any coated film that fulfills the corrosion resistance of the metal foil layer 13 can be used for the anti-corrosion treatment layer 14, not being limited to the coated film formed through the foregoing treatment. For example, phosphate treatment, boehmite treatment, and the like may be used. The anti-corrosion treatment layer 14 is not limited to a single layer, but may be configured by two or more layers obtained such as by coating a resin as an overcoating agent onto an anti-corrosive coated film.

From the viewpoint of the anticorrosive and anchoring functions, the anti-corrosion treatment layer 14 preferably has a thickness of 5 nm (nanometer) or greater but 1 μm or less, and more preferably 10 nm or greater but 200 nm or less.

Typically, chromate treatment is widely used for the anti-corrosion treatment layer 14. However, since use of hexavalent chromium leads to environmental pollution, non-chromium-based treatment using no chromium is preferable. A specific example of the non-chromium-based treatment is treatment in which a polyacrylic acid is over-coated on ceric oxide.

(Adhesive Layer 15)

The adhesive layer 15 is formed between the heat-sealable resin layer 16 and the anti-corrosion treatment layer 14, i.e., on a surface of the anti-corrosion treatment layer 14 on the opposite side of the surface on which the metal foil layer 13 is laminated. For the adhesive layer 15, an adhesive is used. More specifically, as the adhesive applied to the adhesive layer 15, an acid-modified polyolefin can be used. Such an acid-modified polyolefin has both of non-polar and polar parts in the molecules. Thus, an acid-modified polyolefin can be firmly in intimate contact with both of the heat-sealable resin layer 16 that is non-polar and the anti-corrosion treatment layer 14 that is polar. Further, an acid-modified polyolefin has chemical resistance. Thus, an acid-modified polyolefin can prevent lowering of adhesion force due to decomposition and deterioration of the adhesive layer 15 under the conditions where hydrogen fluoride or the like is present, which is produced by reaction of an electrolyte with moisture.

The adhesive layer 15 is formed by applying a coating liquid containing two or more polyolefins. Of the two or more polyolefins contained in the adhesive layer 15, a first polyolefin having a highest melting temperature preferably has a melting temperature of not less than a heat-resistance imparting temperature, but not more than a critical substrate layer thermal deterioration temperature. Of the two or more polyolefins contained in the adhesive layer 15, a second polyolefin having a lowest melting temperature preferably has a melting temperature of not less than a critical heat-resistance temperature, but not more a lamination temperature.

The melting temperature is a measured value in conformity with JIS K7121.

The heat-resistance imparting temperature refers to a critical melting temperature of a polyolefin that can obtain heat resistance needed when preparing and using the secondary battery packaging material and the secondary battery. The secondary battery is likely to generate heat in charging/discharging. Depending on the environment of using the secondary battery, or, for example, when used under high temperature conditions, the secondary battery is required to have heat resistance.

An adhesive layer 15 with a low melting point (melting temperature) cannot keep adhesiveness under high temperature conditions, and will cause release. To provide heat resistance to the adhesive layer 15, the adhesive layer 15 is required to contain the first polyolefin with a high melting temperature.

The prepared packaging material 1 is cut into a size of 100 mm×15 mm, and left in an atmosphere of 80° C. for 5 minutes. Then, the lamination strength between the metal foil layer 13 formed of an aluminum foil and the adhesive layer 15 is measured. The measurement is conducted in an atmosphere of 80° C. with a tension rate of 100 mm/min by means of a T-type peeling method that is a method of testing peeling/adhesion strength regulated by JIS K6854-3. The melting temperature of the first polyolefin having a lamination strength of 3 N/15 mm or greater is referred to as a heat-resistance imparting temperature. To obtain sufficient heat resistance, the heat-resistance imparting temperature, which is the lower limit of the melting temperature of the first polyolefin, is preferably 90° C. or greater.

The critical substrate layer thermal deterioration temperature refers to a critical temperature at which the substrate layer 11 is deteriorated and moldability is impaired when heat is applied to the substrate layer 11 in dry lamination or heat treatment. Heat treatment is performed in preparing the packaging material 1 to melt the adhesive layer 15 for the achievement of intimate contact. When the melting point of the adhesive layer 15 is high, heating has to be performed at a higher temperature, which causes deterioration of the substrate layer 11.

The prepared packaging material 1 is cut into a size of 200 mm×100 mm and set on a cold molding device in a size of 100×50 mm, followed by embossing under the conditions where the head speed is 10 mm/sec and the drawing depth is 6 mm. In this case, a temperature of not causing breakage or pin holes in the molded and stretched portion is referred to as a critical substrate layer thermal deterioration temperature. Although a temperature of impairing moldability depends on the type of the substrate layer 11, the critical substrate layer thermal deterioration temperature is approximately 200° C. However, taking into account of solubility or the like of the adhesive layer 15 into a solvent in dry lamination, the melting temperature of the first polyolefin is preferably 160° C. or less.

The critical heat-resistance temperature refers to a minimum required melting temperature of the second polyolefin to ensure heat resistance which is required for preparing and using the secondary battery packaging material and the secondary battery. The adhesive layer 15, when containing a polyolefin having an extremely low melting temperature, will fail to keep adhesiveness under high temperature conditions and will cause release.

The prepared packaging material 1 is cut into a size of 100 mm×15 mm and left in an atmosphere of 80° C. for 5 minutes. Then, lamination strength between the metal foil layer 13 formed of an aluminum foil and the adhesive layer 15 is measured. The measurement is conducted in an atmosphere of 80° C. with a tension rate of 100 mm/min by means of the T-type peeling method. The melting temperature of the second polyolefin having a lamination strength of 3 N/15 mm or greater is referred to as a critical heat-resistance temperature. To obtain a minimum heat resistance, the critical heat-resistance temperature, which is the lower limit melting temperature of the second polyolefin, is preferably 60° C. or greater.

The lamination temperature refers to a temperature added in bonding the metal foil layer 13 with the heat-sealable resin layer 16 via adhesive layer 15 by dry lamination. In dry lamination, the second polyolefin must have been molten. If the melting temperature of the second polyolefin is higher than the lamination temperature, the second polyolefin will not be molten, and therefore the metal foil layer 13 will not be brought into intimate contact with the heat-sealable resin layer 16.

A high lamination temperature will cause deterioration of the substrate layer 11 when heated, or crystallization of the polyolefin composing the heat-sealable resin layer 16, which will create causes for easily bringing about cracking in deep-draw molding. For the reasons mentioned above, the lamination temperature, which is the upper limit melting temperature of the second polyolefin, is preferably 90° C. or less.

Adhesives that contain the first and second polyolefins and used for materials of the adhesive layer 15 can include coating liquids (dissolved type coating liquids) obtained by dissolving the materials in various solvents, or coating liquids (dispersed type coating liquids) obtained by dispersing the materials therein. Such a coating liquid having dispersion of these polyolefins is required to be baked at a high temperature after the solvent has been dried. Thus, a dissolved type coating liquid is more preferably used than a dispersed type coating liquid. Baking at a high temperature leads to deterioration of the substrate layer 11. Therefore, it can be important that the coating liquid is dried, without baking, at a temperature equal to or greater than the melting temperature of the second polyolefin but less than the melting temperature of the first polyolefin.

When the melting temperature of the first polyolefin is below the heat-resistance imparting temperature, the degree of crystallinity is low. Therefore, water vapor barrier properties and heat resistance are impaired. When the melting temperature of the first polyolefin exceeds the critical substrate layer thermal deterioration temperature, the first polyolefin is not easily dissolved in the solvent, producing the cause of impairing coating suitability. On the other hand, when the melting temperature of the second polyolefin is below the critical heat-resistance temperature, the heat resistance of lamination strength and heat-seal strength is insufficient. When the melting temperature of the second polyolefin exceeds the lamination temperature, the second polyolefin will not be molten. Therefore, the function as an adhesive will not be exerted, disabling adhesion between the anti-corrosion treatment layer 14 and the heat-sealable resin layer 16.

The melting temperature of the first polyolefin being in a range of not less than the heat-resistance imparting temperature but not more than the critical substrate layer thermal deterioration temperature, can impart heat resistance to the packaging material.

The melting temperature of the second polyolefin being in a range of not less than the critical heat-resistance temperature but not more than the lamination temperature, can enable dry lamination at a lower temperature.

Preferably, from the viewpoint of adhesiveness, the first and second polyolefins are those which are polymerized with one, or two or more of at least unsaturated carboxylic acids, anhydrides of unsaturated carboxylic acids, and (meth)acrylic acid esters.

Polyolefins as the component of the first polyolefin are preferably used being admixed with one, or two or more of polybutenes, butene-ethylene copolymers, butene-propylene copolymers, butene-ethylene-propylene copolymers, and butene-α-olefin copolymers. Polyolefins whose melting temperature is in a range of not less than the heat-resistance imparting temperature to not more than the critical substrate layer thermal deterioration temperature, include propylene-ethylene copolymers, propylene-ethylene-butene copolymers, and the like. However, when the ratio of ethylene is increased in order to set the melting temperature to the above-mentioned range, ethylene may not be miscible with propylene, causing decrease in lamination strength or cracking.

Any of polybutenes, butene-ethylene copolymers, butene-propylene copolymers, butene-ethylene-propylene copolymers, and butene-α-olefin copolymers is used to obtain adhesiveness with the heat-sealable resin layer 16. From the viewpoint of adhesiveness and compatibility with the heat-sealable resin layer 16, a mol ratio of butene occupying in a polybutene, butene-ethylene copolymer, butene-propylene copolymer, butene-ethylene-propylene copolymer, or butene-α-olefin copolymer is preferably 70% or more but 98% or less.

Polyolefins that can be used as the component of the second polyolefin include polypropylenes, propylene-ethylene copolymers, propylene-butene copolymers, propylene-ethylene-butene copolymers, and propylene-α-olefin copolymers.

As unsaturated carboxylic acids and anhydrides thereof of the first and second polyolefins, mention can be made of maleic acid, fumaric acid, crotonic acid, itaconic acid, and anhydrides of these acids. As (meth)acrylic acid esters of the first and second polyolefins, mention can be made of (meth)acrylic acid octyl, (meth)acrylic acid lauryl, and the like. These materials only have to be copolymerized with the polyolefins. Forms of copolymerization can include block copolymerization, random copolymerization, graft copolymerization, and the like. These unsaturated carboxylic acids, anhydrides thereof, and (meth)acrylic acid esters may be used singly, or in combination of two or more.

The adhesive layer 15 may contain a resin other than the first and second polyolefins, to an extent of not causing any problem in association with chemical resistance, lamination strength, and heat resistance. In this case, the resin has a melting temperature equal to or greater than that of the second polyolefin but equal to or lower than that of the first polyolefin. As the resins other than the first and second polyolefins, mention can be made of low-, medium- and high-density polyethylenes; and ethylene-α-olefin copolymers, homopolypropylenes, block polypropylenes, random polypropylenes, propylene-α-olefin copolymers, polybutenes, butene-α-olefin copolymers, acid modifications of these materials, or the like.

The first polyolefin is preferably contained in the adhesive layer 15 at a ratio of not less than a heat resistance imparting amount but not more than a critical low temperature lamination amount. The second polyolefin is preferably contained in the adhesive layer 15 at a ratio of not less than a low temperature lamination property imparting amount but not more than a critical heat-resistance amount.

Here, the heat resistance imparting amount refers to a ratio of the first polyolefin contained in the adhesive layer 15, which can required for obtaining heat resistance necessary in preparing and using the secondary battery packaging material and the secondary battery. The first polyolefin having a high melting temperature being contained in the adhesive layer 15 at a ratio of not less than the heat resistance imparting amount, can further improve adhesion force under high temperature conditions to thereby achieve heat resistance. The prepared packaging material 1 is cut into a size of 100 mm×15 mm, and left at an atmosphere of 80° C. for 5 minutes. Then, lamination strength between the metal foil layer 13 formed of an aluminum foil and the adhesive layer 15 is measured in an atmosphere of 80° C. at a tension rate of 100 mm/min by means of a T-type peeling method. The ratio of the first polyolefin having a lamination strength of 4 N/15 mm or greater and contained in the adhesive layer 15 is referred to as a heat resistance imparting amount. To obtain higher or even much higher heat resistance, the heat resistance imparting amount, which is the lower limit ratio of the first polyolefin, is preferably 20 wt % or greater.

The critical low temperature lamination amount refers to the ratio of the first polyolefin contained in the adhesive layer 15, which is required for achieving adhesion between the metal foil layer 13 and the heat-sealable resin layer 16 at a low temperature in dry lamination. When lamination at a high temperature is needed for achieving adhesion, the substrate layer 11 will be deteriorated and moldability will be impaired. To achieve a strong adhesion in lamination at a low temperature, the critical low temperature lamination amount, which is the upper limit ratio of the first polyolefin, is preferably 80 wt % or less.

The low temperature lamination property imparting amount refers to the ratio of the second polyolefin contained in the adhesive layer 15, which is required for achieving adhesion between the metal foil layer 13 and the heat-sealable resin layer 16 at a low temperature in dry lamination. To obtain adhesion in lamination at a low temperature, it is important that the adhesive layer 15 contains a polyolefin whose melting temperature is low. The ratio of the second polyolefin contained in the adhesive layer 15, which does not cause peel-off between the metal foil layer 13 and the heat-sealable resin layer 16 in dry lamination at 100° C. is referred to as a low temperature lamination property imparting amount. The low temperature lamination property imparting amount, which is the lower limit ratio of the second polyolefin is preferably 20 wt % or greater.

The critical heat-resistance amount refers to the ratio of the second polyolefin contained in the adhesive layer 15, which is required for achieving the heat resistance needed in preparing and using the secondary battery packaging material and the secondary battery. To obtain heat resistance, it can be important that a high melting temperature polyolefin is contained in the adhesive layer 15. For the reasons mentioned above, the critical heat-resistance amount, which is the upper limit ratio of the second polyolefin, is preferably 80 wt % or less.

If the ratio of the first polyolefin is below the heat resistance imparting amount, heat resistance will be insufficient, and lamination strength and heat-seal strength will be lowered in a high temperature atmosphere. On the other hand, if the ratio of the first polyolefin exceeds the critical low temperature lamination amount, a non-molten area is increased in dry lamination. Thus, lamination strength is lowered. If the ratio of the second polyolefin is below the low temperature lamination property imparting amount, a non-molten area is increased in dry lamination. Thus, lamination strength is lowered. On the other hand, if the ratio of the second polyolefin exceeds the critical heat-resistance amount, heat resistance will be insufficient, and lamination strength and heat-seal strength will be lowered in a high temperature atmosphere.

The polyolefins contained in the adhesive layer 15 are preferably cross-linked by an imide bond. The cross-linkage by an imide bond in the adhesive layer 15 is preferably a three-dimensional cross-linkage between at least two or more kinds of acid-modified polyolefins, such as between the first polyolefins, between the second polyolefins, or between the first and second polyolefins.

As a method of forming an imide bond, a compound having an imide bond may be polymerized with an acid-modified polyolefin. Alternatively, an imide bond may be formed between acid-modified polyolefins by reaction of the carboxylic acid of the acid-modified polyolefins with a polyfunctional isocyanate compound or the like. In this way, acid-modified polyolefins are cross-linked by an imide bond to increase the molecular weight of the acid-modified polyolefins. Thus, low-molecular-weight unreacted substances are reduced, thereby improving chemical resistance and heat resistance. Since the cross-linkage by an imide bond also improves the modulus of elasticity (Young's modulus) and breaking strength, the film strength of the adhesive layer 15 can be improved.

The weight average molecular weight of the mixture of the polyolefins contained in the adhesive layer 15 is preferably 50,000 or greater but 200,000 or less. When the weight average molecular weight is below 50,000, the mixture is easily dissolved such as in an electrolyte solution or easily swelled, tending to decompose and deteriorate the adhesive layer 15. On the other hand, when the weight average molecular weight exceeds 200,000, the mixture is not dissolved in a solvent or is thickened, for example, decreasing coating suitability. The weight average molecular weight of the mixture being in a range of not less than 50,000 to not more than 200,000 can improve cohesive strength to thereby improve the adhesion strength.

Depending on properties required, materials other than polyolefins can be added to the adhesive layer 15, such materials including olefin elastomers, styrene elastomers, polyester polyols, polyether polyols, polyolefin polyols, aliphatic isocyanates, and aromatic isocyanates.

The adhesive layer 15 preferably has a thickness of 1 µm or greater but 5 µm or less. When the thickness is less than 1 µm, adhesion is decreased and thus lamination strength is not obtained. On the other hand, when the thickness exceeds 5 µm, the adhesive layer 15 is thickened and more easily cracked.

The thickness of the adhesive layer 15 being in a range of not less than 1 µm to not more than 5 µm can firmly adhere the heat-sealable resin layer 16 to the anti-corrosion treatment layer 14.

As described above, the adhesive layer 15 contains two or more polyolefins having different melting temperatures. Thus, the adhesive layer 15 has good chemical resistance to an electrolyte solution or the like, and can improve heat resistance of the lamination strength and the heat-seal strength at a high temperature, which has been a problem of a dry laminated packaging material for storing electricity. The first polyolefin with high melting point has crystallizability higher than that of the second polyolefin with low melting point. Thus, water vapor barrier properties can be enhanced, compared with the case of using only the second polyolefin.

(Heat-Sealable Resin Layer 16)

The heat-sealable resin layer 16 is formed on the anti-corrosion treatment layer 14 via the adhesive layer 15, i.e., on a surface of the adhesive layer 15 on the opposite side of the surface on which the anti-corrosion treatment layer 14 is laminated. The heat-sealable resin layer 16 is laminated on the adhesive layer 15. Thus, when the heat-sealable resin layers 16 of two packaging materials 1 are placed face to face, followed by heat-sealing at a temperature equal to or greater than the melting temperature of the heat-sealable resin layer 16, hermetic sealing can be achieved.

The crystallizability of the heat-sealable resin layer 16 can be controlled to thereby adjust moisture entering from the heat-sealed end portion into the battery. Further, the melting viscosity of the heat-sealable resin layer 16 can be adjusted to thereby adjust fluidity of a resin extruded in heat-sealing.

Polyolefins can be used for the heat-sealable resin layer 16. Polyolefins that can be used include low-, medium- and high-density polyethylenes, homopolypropylenes, block polypropylenes, random polypropylenes, and the like. Polyolefins that can be used further include copolymers obtained by copolymerizing the polyolefins mentioned above with polar molecules such as of acrylic acid or methacrylic acid, or polymers, such as cross-linked polyolefins. Thus, resins applied with dispersion, copolymerization or the like can be used.

These polyolefins may be used singly, or in combination of two or more.

The heat-sealable resin layer 16 preferably contains a third polyolefin whose melting temperature is not less than the heat-resistance imparting temperature but is not more than the critical substrate layer thermal deterioration temperature. When the heat-sealable resin layer 16 contains the third polyolefin, heat treatment is performed at a temperature of not less than the melting temperature of the third polyolefin in a heat treatment step (heating and cooling step) described later. Accordingly, the heat-sealable resin layer 16 melts even at a low temperature, and adhesion to the adhesive layer 15 can be obtained.

Heat treatment performed at a high temperature in the heat treatment step can cause cracking and whitening due to the crystallization of the heat-sealable resin layer 16 or lowering of moldability due to deterioration of the substrate layer 11.

The heat-sealable resin layer 16 may contain various additives, such as slip agents, anti-blocking agents, antistatic agents, nucleating agents, pigments, and dyes. These additives may be used singly or in combination of two or more.

When a lubricant is formulated in the heat-sealable resin layer 16, the formulation ratio of the lubricant in the heat-sealable resin layer 16 (100 mass %) is preferably 0.001 mass % or greater but 0.5 mass % or less. When the formulation ratio of the lubricant is 0.001 mass % or greater, the effect of minimizing whitening of the heat-sealable resin layer 16 in cold molding is easily obtained. When the formulation ratio of the lubricant is 0.5 mass % or less, the lubricant bleeds over the lamination surface between the heat-sealable resin layer 16 and another layer, other than the surface of the packaging material 1, whereby lowering of adhesion strength is more easily suppressed.

The melt mass flow rate (MFR) of the heat-sealable resin layer 16 is preferably 3 g/10 min or greater but 30 g/10 min or less at 230° C. and 2.16 kgf. The heat-sealable resin layer 16 preferably has a thickness of 20 μm or greater but 90 μm or less. When the thickness is less than 20 μm, a sufficient lamination strength cannot be ensured. When the thickness exceeds 90 μm, permeability of water vapor will be excessively high.

(Coating Layer 17)

In the present invention, a coating layer 17, as illustrated in FIG. 1, may be provided as necessary on a surface of the substrate layer 11 on the opposite side of the surface opposed to the metal foil layer 13.

The coating layer 17 is formed on a surface of the substrate layer 11 on the opposite side of the surface opposed to the metal foil layer 13, according to desired properties. Addition of the coating layer 17 can additionally provide, for example, scratch resistance to prevent scratching or the like of the substrate layer 11, or chemical resistance to prevent dissolution of the substrate layer 11 due to leakage of an electrolyte solution or the like. Addition of the coating layer 17 can further provide, for example, slipperiness or deep-drawing properties by surface shaping for improving moldability.

Materials for the coating layer 17 include, for example, olefin resins, acrylic resins, urethane resins, ester resins, epoxy resins, fluorine resins, silicon resins, alkyd resins, melamine resins, siloxane resins, amide resins, imide resins, cellulose resins, and vinyl acetate resins.

As additives that can be added to the coating layer 17, mention can be made of fillers, pigments, dyes, fire retardant, slip agents, anti-blocking agents, antioxidants, light stabilizers, tackifiers, antistatic agents, and the like. These additives may be dispersed in a resin, or may be coated on a surface.

From the viewpoint of followability, processability or the like, the coating layer 17 preferably has a thickness of 0.01 μm or greater but 50 μm or less, and more preferably 0.1 μm or greater but 30 μm or less.

(Method for Manufacturing the Packaging Material)

In the following, a method for manufacturing the packaging material 1 according to the present embodiment will be described.

The method for manufacturing the packaging material 1 can include, for example, steps (I-1) to (III-1) set forth below.

(I-1) The anti-corrosion treatment layer 14 is formed on one surface of the metal foil layer 13 by means of gravure coating.

Figure 2:
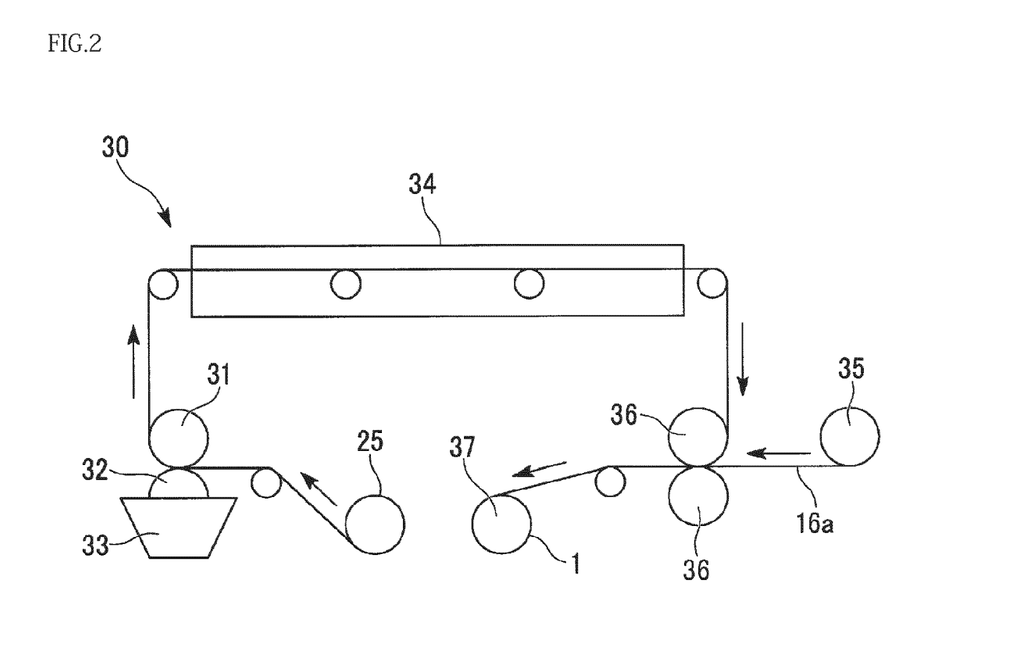
FIG. 2 is a diagram illustrating a manufacturing apparatus used for manufacturing the secondary battery packaging material according to the embodiment of the present invention.

(II-1) The substrate layer 11 is stuck, via the substrate adhesive layer 12, onto a surface of the metal foil layer 13 on the opposite side of the surface on which the anti-corrosion treatment layer 14 is laminated, by using a dry lamination method to prepare a laminate 25 (see FIG. 2, anti-corrosion treatment layer 14/metal foil layer 13/substrate adhesive layer 12/substrate layer 11).

(III-1) The heat-sealable resin layer 16 is stuck, via the adhesive layer 15, onto a surface of the metal foil layer 13 on the opposite side of the surface opposed to the substrate layer 11, by using a dry lamination method to prepare the packaging material 1 (heat-sealable resin layer 16/adhesive layer 15/anti-corrosion treatment layer 14/metal foil layer 13/substrate adhesive layer 12/substrate layer 11).

As necessary, the following step (IV-1) may be performed in addition to steps (I-1) to (III-1).

(IV-1) The obtained packaging material 1 is heated at a temperature equal to or above the melting temperatures of the second polyolefin, and the third polyolefin configuring the heat-sealable resin layer 16, followed by cooling at a temperature equal to or below the crystallization temperatures of the adhesive layer 15 and the heat-sealable resin layer 16.

Through step (IV-1), more firm adhesion can be achieved and thus long-term reliability is enhanced.

Next, steps of manufacturing the packaging material will be described in detail.

Step (I-1)

An anticorrosive agent is coated onto one surface of the metal foil layer 13, followed by baking to form the anti-corrosion treatment layer 14. At this time, the anti-corrosion treatment can be applied to both surfaces of the metal foil layer 13, instead of one surface thereof.

Any method can be used for coating the anticorrosive agent. For example, such coating methods can include gravure coating, gravure reverse coating, roll coating, reverse roll coating, die coating, bar coating, kiss coating, comma coating, or the like.

Step (II-1)

The substrate layer 11 is stuck, via the substrate adhesive layer 12, onto a surface of the metal foil layer 13 on the opposite side of the surface on which the anti-corrosion treatment layer 14 is laminated, by using a dry lamination method to prepare a laminate 25 (anti-corrosion treatment layer 14/metal foil layer 13/substrate adhesive layer 12/substrate layer 11).

Any method can be used for coating the substrate adhesive layer 12. For example, such coating methods can include gravure coating, gravure reverse coating, roll coating, reverse roll coating, die coating, bar coating, kiss coating, comma coating, or the like. At step (II-1), in order to accelerate curing reaction or to stabilize crystallization, an aging treatment is preferably performed at a temperature in a range of not less than 20° C. to not more than 100° C. When the temperature is below 20° C., the curing reaction is not accelerated. When the temperature is higher than 100° C., the substrate layer 11 is deteriorated, which impairs moldability.

Step (III-1)

As illustrated in FIG. 2, at step (III-1) of manufacturing the packaging material 1 using the laminate 25, a manufacturing apparatus 30 is used, which includes a backup roll 31, a gravure roll 32, an ink pan 33, an oven 34, a heat-sealable resin roll 35, and nip rolls 36.

The laminate 25 is fed from a first shaft of the manufacturing apparatus 30. On the surface of the metal foil layer 13, on which the anti-corrosion treatment layer 14 is formed, the adhesive layer 15 is coated by the gravure roll 32, for example, followed by drying the solvent in the oven 34. The adhesive layer 15 is formed by coating a coating liquid, not shown, containing the first and second polyolefins onto the anti-corrosion treatment layer 14 (adhesive layer forming step).

After that, a heat-sealable resin 16a wound about the heat-sealable resin roll 35 and containing the third polyolefin is fed from a second shaft of the manufacturing apparatus 30. The heat-sealable resin 16a is thermocompression-bonded onto the adhesive layer 15 by dry lamination using the nip rolls 36 to form the heat-sealable resin layer 16 on the adhesive layer 15 (heat-sealable resin layer forming step), thereby preparing the packaging material 1. The heat-sealable resin layer forming step is performed at a temperature equal to or higher than the melting temperature of the second polyolefin, but lower than the melting temperature of the first polyolefin that is a temperature lower than the melting temperature of the third polyolefin.

The prepared packaging material 1 is taken up by a roll 37.

Performing dry lamination at the dry lamination temperature, the second polyolefin is molten, and the anti-corrosion treatment layer 14 can be firmly adhered to the heat-sealable resin layer 16.

In the heat-sealable resin layer forming step, the first polyolefin, which is miscible with the second polyolefin, can be imparted with heat resistance without being separated from the second polyolefin in the adhesive layer 15. In dry lamination at a temperature below the melting temperature of the second polyolefin, the second polyolefin is not molten. Therefore, the function as an adhesive is not exerted, and thus the anti-corrosion treatment layer 14 cannot be adhered to the heat-sealable resin layer 16. On the other hand, in dry lamination at a temperature equal to or higher than the melting temperature of the first polyolefin and equal to or higher than the melting temperature of the third polyolefin, the polyolefin configuring the heat-sealable resin layer 16 is crystallized and cracks are easily caused in deep-draw molding.

The method of coating the adhesive to form the adhesive layer 15 is not particularly limited. Coating methods including, for example, gravure coating, gravure reverse coating, roll coating, reverse roll coating, die coating, bar coating, kiss coating, comma coating, and the like can be used.

To accelerate curing reactions or stabilize crystals, it is preferable that the heat-sealable resin layer forming step of step (III-1) is followed by a first aging step where the packaging material 1 is aged at a temperature of not less than 20° C. but not more than 100° C. At a temperature below 20° C., the curing reaction is not accelerated, while at a temperature higher than 100° C., the substrate layer 11 is deteriorated and moldability is lowered.

Step (IV-1)

As necessary, after the first aging step, or without performing the first aging process after the heat-sealable resin layer forming step, heat treatment is performed to heat and then cool the obtained packaging material 1 (heating and cooling step). For the heating step, for example, a heated oven and a heated roll can be used, while, for the cooling step, a cooling roll or the like can be used.

It is important that the heating temperature in the heating at step (IV-1) is in a range of not less than the melting temperature of the first polyolefin or not less than the melting temperature of the third polyolefin, to not more than the critical substrate layer thermal deterioration temperature. At a heating temperature below the above range, the adhesive layer 15 and the heat-sealable resin layer 16 are not fully molten. Thus, wetting for the anti-corrosion treatment layer 14 is considerably poor, and adhesion strength is not improved. On the other hand, at a temperature higher than the critical substrate layer thermal deterioration temperature, the substrate layer 11 is deteriorated and it is difficult to satisfy mechanical characteristics required for the substrate layer 11.

At step (IV-1), it is important to perform cooling at a temperature of 10° C. or greater that is a temperature below crystallization temperature of the adhesive layer 15 and below crystallization temperature of the heat-sealable resin layer 16. At a cooling temperature below 10° C., condensation is likely to be formed on the cooling roll. The condensed water droplets are transferred to the surface of the heat-sealable resin layer 16, creating a defective appearance. On the other hand, at a cooling temperature equal to or above the crystallization temperature, the adhesive layer 15 and the heat-sealable resin layer 16 molten by heating are gradually cooled and crystallized, and thus tend to be embrittled. Therefore, cracks are easily caused at the time of performing stretching such as in deep-draw molding, or at the time of bending.

To accelerate crystallization and reaction, the heating and cooling step at step (IV-1) may be followed by a second aging step, as necessary, where the packaging material 1 is aged at a temperature of not less than 20° C. but not more than 100° C.

At a temperature below 20° C., curing reaction is not accelerated, while at a temperature higher than 100° C., the substrate layer 11 is deteriorated and moldability is lowered.

As described above, the packaging material 1 is manufactured through steps (I-1) to (III-1), and step (IV-1) performed as necessary.

(Method for Manufacturing a Secondary Battery)

Referring now to FIGS. 3 to 6, a method for manufacturing a laminate type secondary battery will be described by way of an example of the present embodiment. However, the method for manufacturing a secondary battery is not limited to the method described below.

As the method for manufacturing a secondary battery, for example, a method including steps (I-1) to (IV-1) below can be used.

Figure 3:
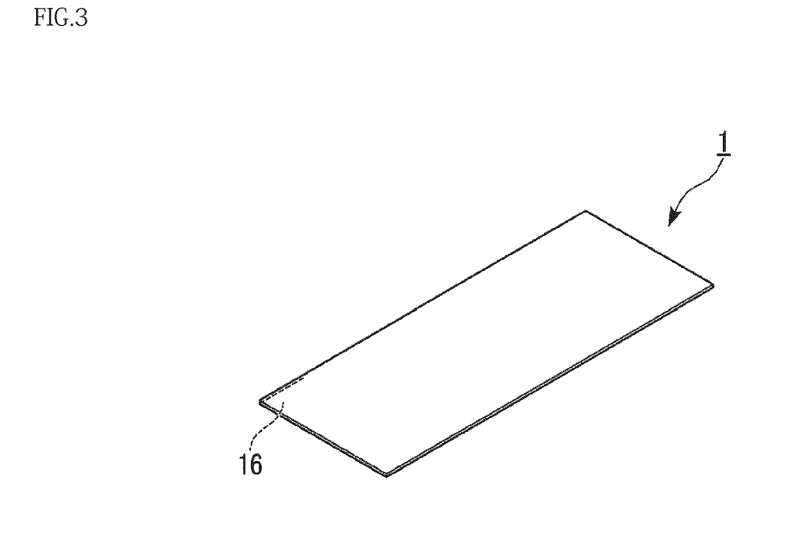
FIG. 3 is a perspective view illustrating a method for manufacturing the secondary battery packaging material according to the embodiment of the present invention.
Figure 4:
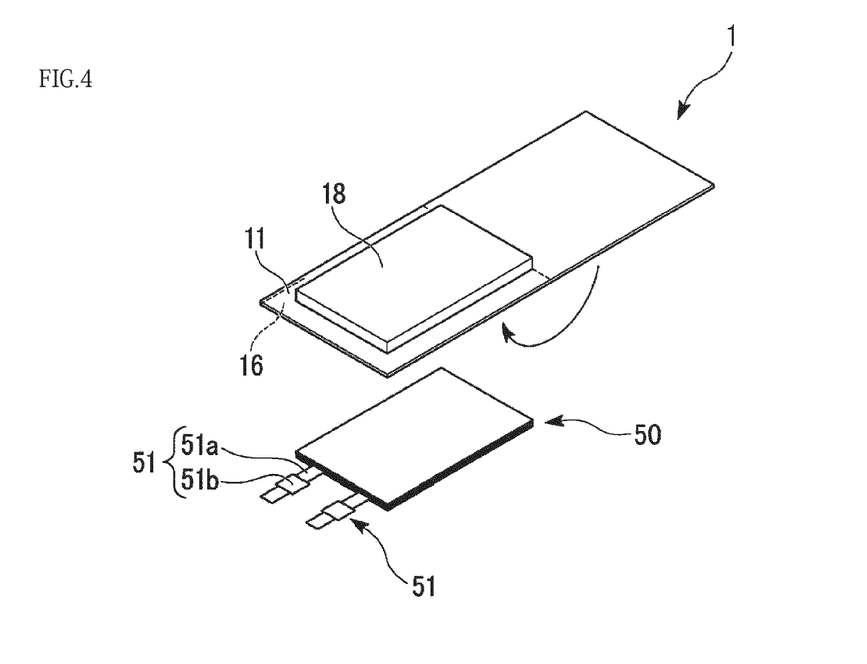
FIG. 4 is a perspective view illustrating the method for manufacturing the secondary battery packaging material according to the embodiment of the present invention.

(I-1) A step of forming a molded portion 18 on the packaging material 1 to dispose a battery member 50 (see FIGS. 3 and 4).

Figure 5:
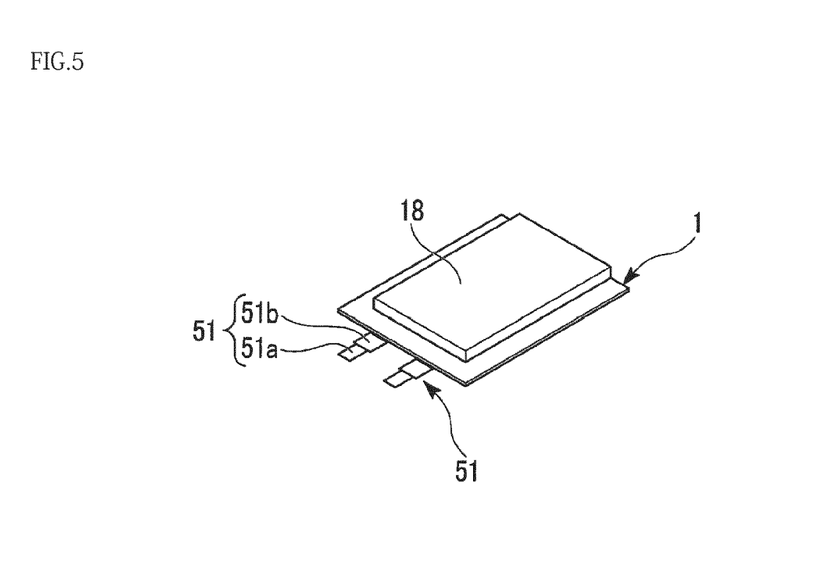
FIG. 5 is a perspective view illustrating the method for manufacturing the secondary battery packaging material according to the embodiment of the present invention.

(II-1) A step of disposing the battery member 50 on the molded portion 18 of the packaging material 1, followed by covering with the packaging material 1 to perform heat-sealing of tabs 51 (see FIGS. 4 and 5).

(III-1) A step of heat-sealing sides, leaving one side unsealed other than the side of the tabs 51, followed by injecting an electrolyte solution from the side that has been left unsealed and heat-sealing the side in a vacuum state (see FIG. 5).

Figure 6:
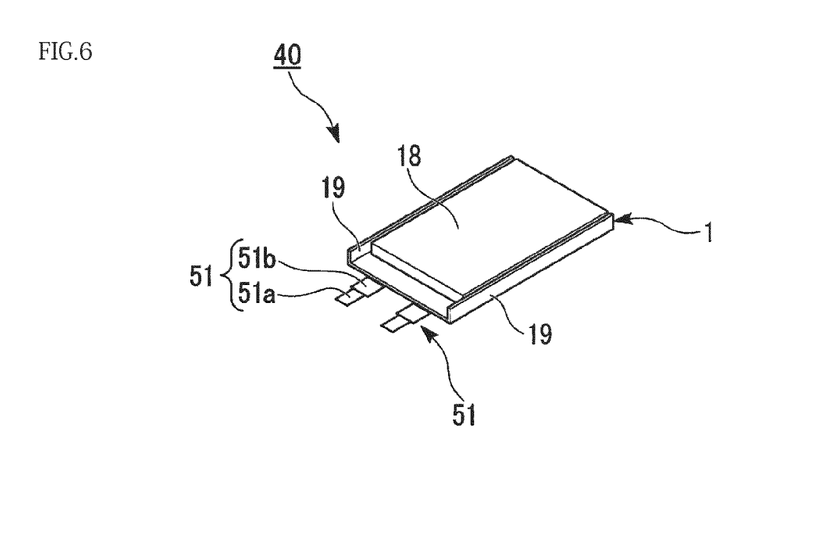
FIG. 6 is a perspective view illustrating the method for manufacturing the secondary battery packaging material according to the embodiment of the present invention.

(IV-1) A step of cutting the end portions of the heat-sealed sides other than the side of the tabs 51, and folding over the sides toward the molded portion 18 (see FIG. 6).

Next, steps (I-1), (II-1), (III-1) and (IV-1) for manufacturing a laminate type secondary battery will be described in detail.

Step (I-1)

The packaging material 1 is shaped with a die in such a way that the surface on which the heat-sealable resin layer 16 is formed as illustrated in FIG. 3 will have a desired molding depth taking account of rebound. As the molding method, a die including a female die and a male die and having a gap deeper than the thickness of the entire packaging material 1 is used. Using the die, deep-draw molding is performed from the heat-sealable resin layer 16 toward the substrate layer 11 to form the molded portion 18 illustrated in FIG. 4. Thus, the packaging material 1 having a desired deep-drawing amount can be obtained.

The friction coefficient of the surface of the packaging material 1 is reduced to reduce the friction between the die and the packaging material 1 and cause the packaging material 1 to flow from a film presser. As a result, the packaging material 1 can be more deeply molded.

Step (II-1)

The battery member 50 configured of a positive electrode, a separator, and a negative electrode (reference signs are omitted) is placed in the molded portion 18 of the packaging material 1. The tabs 51, each having a tab lead 51a and a tab sealant 51b joined to positive and negative electrodes, are drawn out of the molded portion 18.

After that, as illustrated in FIG. 5, the packaging material 1 is bent to overlay a part of the heat-sealable resin layers 16 on the other part thereof, and then the area around the tabs 51 of the packaging material 1 is heat-sealed. Heat-sealing can be controlled with three conditions which are temperature, pressure, and time. Specifically, heat-sealing is performed under moderate pressure conditions where the heat-sealable resin layer 16 will be reliably molten at the melting temperature of the heat-sealable resin layer 16 or higher, and a large molten resin accumulation will not be formed.

Step (III-1)

Subsequently, heat-sealing is similarly performed for the surrounding areas, leaving one side unsealed other than the side of the tabs 51. After that, an electrolyte solution in which an electrolyte is dissolved is injected from the side that has been left unsealed, and a degassing step is performed in the aging treatment. After that, the side that has been left unsealed is finally heat-sealed in a vacuum state in such a manner that no air enters inside the bent packaging material 1.

Step (IV-1)

The end portions of the heat-sealed sides of the packaging material 1 are cut other than the side of the tabs 51, and the heat-sealable resin layer 16 protruded from the end portions is removed. After that, as illustrated in FIG. 6, the heat-sealed portions of the packaging material 1 are folded toward the molded portion 18, and folded portions 19 are formed. Thus, a dry laminate type secondary battery 40 for a storage battery provided with the packaging material 1 is manufactured.

Through steps (I-1) to (IV-1) described above, the secondary battery 40 is obtained.

EXAMPLES

In the following, the present invention will be described in detail by way of examples. However, the present invention should not be construed as being limited by the following description.

[Materials Used]

Materials used in the present examples are shown below.

(Substrate Layer 11)

Substrate A-1: Biaxially oriented nylon film (Substrate Adhesive Layer 12)

Substrate adhesive B-1: Two-liquid curing type polyester urethane adhesive (Metal Foil Layer 13)

Metal foil C-1: Annealed soft aluminum foil 8079 material (Anti-Corrosion Treatment Layer 14)

Treating agent D-1: Treating agent made of ceric oxide (anti-corrosive multilayer)

(Adhesive Layer 15)

Adhesive E-1: Imide cross-linked acrylic modified maleic anhydride modified polyolefin (50 wt % butene-ethylene copolymer (with a melting temperature of 110° C.) and 50 wt % propylene-ethylene copolymer (with a melting temperature of 70° C.))

Adhesive E-2: Imide cross-linked acrylic modified maleic anhydride modified polyolefin (80 wt % butene-ethylene copolymer (with a melting temperature of 110° C.) and 20 wt % propylene-ethylene copolymer (with a melting temperature of 70° C.))

Adhesive E-3: Imide cross-linked acrylic modified maleic anhydride modified polyolefin (20 wt % butene-ethylene copolymer (with a melting temperature of 110° C.) and 80 wt % propylene-ethylene copolymer (with a melting temperature of 70° C.))

Adhesive E-4: Imide cross-linked acrylic modified maleic anhydride modified polyolefin (100 wt % propylene-ethylene copolymer (with a melting temperature of 150° C.))

Adhesive E-5: Imide cross-linked acrylic modified maleic anhydride modified polyolefin (100 wt % propylene-ethylene copolymer (with a melting temperature of 70° C.))

Adhesive E-6: Two-liquid curing type polyester urethane adhesive (Heat-Sealable Resin Layer 16)

Heat-sealable resin F-1: Unmodified polypropylene film (with a melting temperature of 150° C.)

Methods for manufacturing a packaging material in the examples and comparative examples will be described.

Example 1

The treating agent D-1 was coated onto the metal foil C-1 (with a thickness of 40 μm) by means of a bar coater, followed by baking in a drying unit, thereby forming an anti-corrosion treatment layer with a dry thickness of 100 nm.

Subsequently, the substrate adhesive B-1 was coated onto a surface of the metal foil C-1 on the opposite side of the surface on which the anti-corrosion treatment layer was formed, so as to have a dry thickness of 4 followed by dry-laminating the substrate A-1 (with a thickness of 25 μm) at a temperature of 40° C. After that, the resultant object was subjected to aging treatment at a temperature of 40° C. for 7 days to cross-link the substrate adhesive B-1, thereby preparing a laminate.

Subsequently, the adhesive E-1 was coated onto the anti-corrosion treatment layer of the laminate so as to have a dry thickness of 3 followed by dry-laminating the heat-sealable resin F-1 (with a thickness of 40 μm) at a temperature of 100° C. After that, the resultant object was subjected to aging treatment at a temperature of 40° C. for 7 days to achieve cross-linking, thereby fabricating a packaging material.

Example 2

A laminate was prepared in a manner similar to example 1. After that, the adhesive E-2 was coated onto the anti-corrosion treatment layer of the laminate so as to have a dry thickness of 3 μm, followed by dry-laminating the heat-sealable resin F-1 (with a thickness of 40 μm) at a temperature of 100° C. After that, the resultant object was subjected to aging treatment at a temperature of 40° C. for 7 days to achieve cross-linking, thereby fabricating a packaging material.

Example 3

A laminate was prepared in a manner similar to example 1. After that, the adhesive E-3 was coated onto the anti-corrosion treatment layer of the laminate so as to have a dry thickness of 3 μm, followed by dry-laminating the heat-sealable resin F-1 (with a thickness of 40 μm) at a temperature of 100° C. After that, the resultant object was subjected to aging treatment at a temperature of 40° C. for 7 days to achieve cross-linking, thereby fabricating a packaging material.

Example 4

A packaging material was prepared in a manner similar to example 1. After that, the packaging material was heated in an oven at a temperature of 140° C., immediately followed by cooling to a temperature of 20° C. using a cooling roll. Thus, a heat-treated packaging material was fabricated through the heat treatment that included heating and cooling step.

Comparative Example 1

A laminate was prepared in a manner similar to example 1. After that, the adhesive E-4 was coated onto the anti-corrosion treatment layer of the laminate so as to have a dry thickness of 3 μm, followed by dry-laminating the heat-sealable resin F-1 (with a thickness of 40 μm) at a temperature of 100° C. After that, the resultant object was subjected to aging treatment at a temperature of 40° C. for 7 days to achieve cross-linking, thereby fabricating a packaging material.

Comparative Example 2

A laminate was prepared in a manner similar to example 1. After that, the adhesive E-5 was coated onto the anti-corrosion treatment layer of the laminate so as to have a dry thickness of 3 μm, followed by dry-laminating the heat-sealable resin F-1 (with a thickness of 40 μm) at a temperature of 100° C. After that, the resultant object was subjected to aging treatment at a temperature of 40° C. for 7 days to achieve cross-linking, thereby fabricating a packaging material.

Comparative Example 3

A laminate was prepared in a manner similar to example 1. After that, the adhesive E-1 was coated onto the anti-corrosion treatment layer of the laminate so as to have a dry thickness of 3 μm, followed by dry-laminating the heat-sealable resin F-1 (with a thickness of 40 μm) at a temperature of 60° C. After that, the resultant object was subjected to aging at a temperature of 40° C. for 7 days to achieve cross-linking, thereby fabricating a packaging material.

Comparative Example 4

A laminate was prepared in a manner similar to example 1. After that, the adhesive E-1 was coated onto the anti-corrosion treatment layer of the laminate so as to have a dry thickness of 3 μm, followed by dry-laminating the heat-sealable resin F-1 (with a thickness of 40 μm) at a temperature of 140° C. After that, the resultant object was subjected to aging treatment at a temperature of 40° C. for 7 days to achieve cross-linking, thereby fabricating a packaging material.

Comparative Example 5

A laminate was prepared in a manner similar to example 1. After that, the adhesive E-6 was coated onto the anti-corrosion treatment layer of the laminate so as to have a dry thickness of 3 μm, followed by dry-laminating the heat-sealable resin F-1 (with a thickness of 40 μm) at a temperature of 100° C. After that, the resultant object was subjected to aging treatment at a temperature of 40° C. for 7 days to achieve cross-linking, thereby fabricating a packaging material.

[Evaluation Method for Chemical Resistance]

Ethylene carbonate (EC), dimethylcarbonate (DMC), and diethyl carbonate (DEC) were mixed at a weight ratio of 1:1:1, and lithium hexafluorophosphate ($LiPF_6$) was added thereto by 1 mol/l. After that, moisture was added by 1,000 ppm to the mixture relative to the lithium hexafluorophosphate to prepare an electrolyte solution. In the prepared electrolyte solution, the packaging material cut into a size of 100 mm×15 mm was immersed and stored in an environment of 85° C. for 4 weeks, and then the temperature was returned to ordinary temperatures. The lamination strength between the metal foil layer made of an aluminum foil and the adhesive layer was measured at a tension rate of 100 mm/min by means of a T-type peeling method.

The results were evaluated according to the following criteria.

"G (Good)": Had lamination strength of 3 N/15 mm or greater.

"P (Poor)": Had lamination strength of less than 3 N/15 mm.

[Evaluation Method for Heat Resistance of Lamination Strength]

The packaging material cut into a size of 100 mm×15 mm was left in an atmosphere of 80° C. for 5 minutes. Then, lamination strength between the metal foil layer made of an aluminum foil and the adhesive layer was measured in an atmosphere of 80° C. at a tension rate of 100 mm/min by means of a T-type peeling method.

The results were evaluated according to the following criteria.

"G (Good)": Had high-temperature lamination strength of 3 N/15 mm or greater.

"P (Poor)": Had high-temperature lamination strength of less than 3 N/15 mm.

[Evaluation Method for Deep-Draw Moldability]

The prepared packaging material was cut into a size of 200 mm×100 mm. Then, the cut packaging material was set on a cold molding device in a size of 100×50 mm and embossed under the conditions of 10 mm/sec head speed and 6 mm drawing depth. Through visual observation and observation with an optical microscope, it was confirmed whether there was occurrence of breakage or pin holes in the molded and stretched portion.

The results were evaluated according to the following criteria.

"G (Good)": Had no breakage or pin holes in the molded and stretched portion.

"P (Poor)": Had breakage or pin holes in the molded and stretched portion.

[Evaluation Method for Crack Resistance in Molding]

The prepared packaging material, after being aged at a temperature of 40° C. for 6 days, was cut into a size of 200 mm×100 mm. Then, the cut packaging material was set on a cold molding device in a size of 100×50 mm, followed by embossing under the conditions of 10 mm/sec head speed and 5 mm drawing depth. Through visual observation and observation with an optical microscope, it was confirmed whether the molded and stretched portion was whitened by cracking.

The results were evaluated according to the following criteria.

"G (Good)": Whitening was not caused in the molded and stretched portion.

"P (Poor)": Whitening was caused in the molded and stretched portion.

[Evaluation Method for Water Vapor Barrier Properties]

The prepared packaging material was cut into a size of 240 mm×70 mm. Then, a middle portion between short sides of the cut packaging material was folded over, and two long sides thereof were heat-sealed in a width of 3 mm. After that, from the remaining short side, an electrolyte solution was injected by 3 mg, in which ethylene carbonate (EC), dimethylcarbonate (DMC), and diethyl carbonate (DEC) were mixed at a weight ratio of 1:1:1 with a moisture content being reduced to 20 ppm or less. After that, the remaining one side was similarly heat-sealed in a width of 3 mm, thereby preparing a sample in a size of 120 mm×70 mm for measuring moisture permeance.

The prepared sample was stored in an environment of 60° C. at a humidity of 90% for 4 weeks, followed by measuring moisture content in the electrolyte solution using a Karl Fischer tester. The moisture content was evaluated relative to example 1 as a reference (100%).

The results were evaluated according to the following criteria.

"G (Good)": Had moisture content of less than 120% compared to example 1.

"P (Poor)": Had moisture content of 120% or greater compared to example 1.

It should be noted that, since the moisture content of example 1 is 100% as compared with the moisture content of example 1, evaluation of example 1 is "G".

Table 1 shows the results on chemical resistance, heat resistance of lamination strength, deep-draw moldability, crack resistance in molding, and water vapor barrier properties of examples 1 to 4 and comparative examples 1 to 5.

TABLE 1

|  | Chemical Resistance | Heat Resistance | Deep Drawing Properties | Crack Resistant Properties In Forming | Water Vapor Barrier Properties |
| --- | --- | --- | --- | --- | --- |
| Example 1 | G | G | G | G | G |
| Example 2 | G | G | G | G | G |
| Example 3 | G | G | G | G | G |
| Example 4 | G | G | G | G | G |
| Comparative Example 1 | P | P | G | G | G |
| Comparative Example 2 | G | P | G | G | G |
| Comparative Example 3 | P | P | G | G | G |
| Comparative Example 4 | G | G | P | P | G |
| Comparative Example 5 | P | P | G | G | P |

Regarding comparison in chemical resistance, a strength of 3 N/15 mm or greater was obtained in examples 1 to 4 and comparative examples 2 and 4. On the other hand, the strength was 3 N/15 mm in comparative examples 1, 3, and 5.

In comparative example 1, an adhesive with a high melting temperature was used. Thus, the adhesive was not molten in dry lamination, and no lamination strength was exhibited. In comparative example 3, the temperature in dry lamination was low. Thus, similarly, the adhesive was not molten, and no lamination strength was exhibited. In comparative example 5, the initial lamination strength had a value of 3 N/15 mm or greater (not shown). However, the adhesive was decomposed by hydrofluoric acid, and the lamination strength was lowered.

Regarding comparison in heat resistance of lamination strength, a strength of 3 N/15 mm or greater was obtained in examples 1 to 4 and comparative example 4. On the other hand, the strength resulted in less than 3 N/15 mm in comparative examples 1 to 3 and 5.

In comparative example 1, an adhesive of high melting temperature was used. Thus, the adhesive was not molten in dry lamination, and no lamination strength was exhibited. In comparative example 2, the initial lamination strength had a value of 3 N/15 mm or greater (not shown). However, in an atmosphere of not less than the melting temperature of the adhesive, the adhesive was softened, resulting in a strength of less than 3 N/15 mm. In comparative example 3, the temperature in dry lamination was low. Thus, the adhesive was not molten, and no lamination strength was exhibited. In comparative example 5, the adhesive was softened at a high temperature and no lamination strength was exhibited.

Regarding comparison in deep-draw moldability, no pin hole or breakage was confirmed in examples 1 to 4 and comparative examples 1 to 3 and 5. On the other hand, in comparative example 4, breakage was confirmed in the molded portion.

In comparative example 4, dry lamination was performed at a high temperature. Thus, the substrate layer was deteriorated, and no moldability was exhibited.

Regarding comparison in crack resistance in molding, no molding whitening was confirmed in examples 1 to 4 and comparative examples 1 to 3 and 5. On the other hand, molding whitening was confirmed in the molded portion in comparative example 4.

In comparative example 4, dry lamination was performed at a high temperature. Thus, the crystallization of the heat-sealable resin layer was accelerated, and whitening caused by cracking was visually observed.

Regarding comparison in water vapor barrier properties, only examples 2 to 4 and comparative examples 1 to 4 showed the moisture content of less than 120% relative to example 1. On the other hand, only comparative example 5 showed the moisture content of 120% or more.

In comparative example 5, the adhesive contained a polar group and had non-crystallization properties. Thus, it is considered that the adhesive collected moisture and had it easily permeated to thereby increase the moisture content.

As described above, the packaging material 1 and the secondary battery 40 of the present embodiment have good chemical resistance, heat resistance of lamination strength, deep-draw moldability, crack resistance in molding, and water vapor barrier properties in heat-sealed end portions.

The heat-sealable resin layer 16 contains the third polyolefin. Therefore, when the packaging material 1 is heated to not less than the melting temperature of the third polyolefin, with the heat-sealable resin layers 16 being in contact with each other, sealing can be achieved between the packaging materials 1.

An embodiment of the present invention has been specifically described so far with reference to the drawings. However, specific configuration is not limited to the present embodiment. Design modifications, deletions, and the like without departing from the spirit of the present invention should also be encompassed by the present invention.

Figure 7:
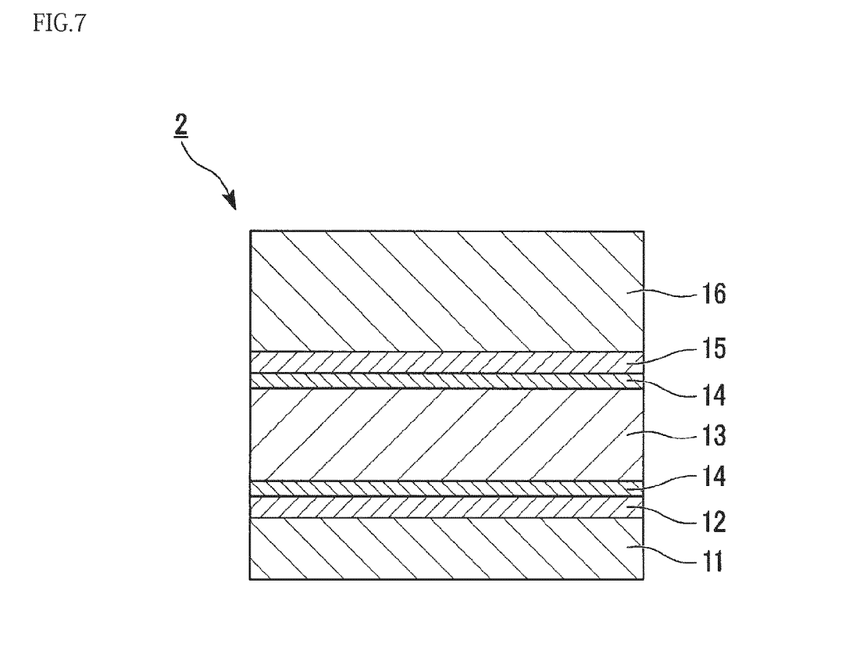
FIG. 7 is a side cross-sectional view illustrating a secondary battery packaging material according to a modification of the embodiment of the present invention.

For example, as in a packaging material 2 illustrated in FIG. 7, the anti-corrosion treatment layer 14 may be provided between the substrate adhesive layer 12 and the metal foil layer 13, in addition to the configurations of the packaging material 1 of the foregoing embodiment.

With the configuration of the packaging material 2, the surface of the metal foil layer 13 opposed to the substrate layer 11 can be prevented from corroding.

Figure 8:
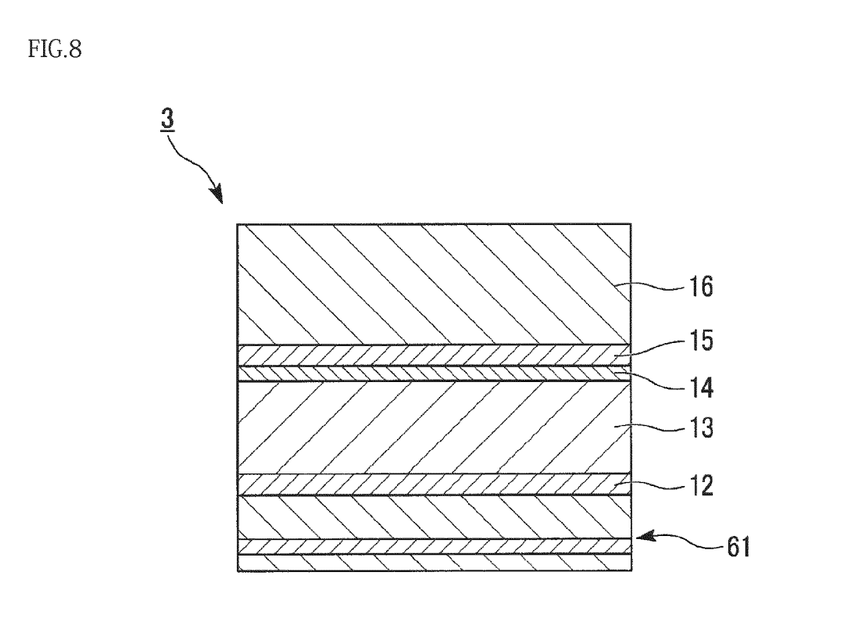
FIG. 8 is a side cross-sectional view illustrating a secondary battery packaging material according to a modification of the embodiment of the present invention.

As in a packaging material 3 illustrated in FIG. 8, a substrate layer 61 may be provided instead of the substrate layer 11 of the packaging material 1 of the foregoing embodiment.

Although reference signs are omitted, the substrate layer 61 is a multilayer film including three laminated layers. An example of the layer configuration of the multilayer film can be a configuration in which layers of polyamide, polyester elastomer and polyester are laminated in this order.

REFERENCE SIGNS LIST 1, 2, 3 Packaging material (secondary battery packaging material)
11, 61 Substrate layer
11a One surface
13 Metal foil layer
14 Anti-corrosion treatment layer
15 Adhesive layer
16 Heat-sealable resin layer
16a Heat-sealable resin
40 Secondary battery

What is claimed is:

1. A secondary battery packaging material comprising:
a substrate layer having a first surface and the substrate layer containing polyester, polyamide, or a combination thereof;
a metal foil layer laminated on the first surface of the substrate layer;
an anti-corrosion treatment layer laminated on the metal foil layer;
an adhesive layer laminated on the anti-corrosion treatment layer and containing two or more polyolefins; and
a heat-sealable resin layer laminated on the adhesive layer,
wherein of the two or more of polyolefins of the adhesive layer, a first polyolefin having the highest melting temperature of the two or more olefins with a melting temperature of from not less than 90° C. to not more than 160° C.; and a second polyolefin having the lowest melting temperature of the two or more olefins with a melting temperature of from not less than 60° C. to not more than 90° C. and wherein the heat-sealable resin layer contains a third polyolefin, with the third polyolefin having a melting temperature of from not less than 90° C. to not more than 160° C., wherein the first polyolefin and the second polyolefin contained in the adhesive layer are cross-linked by an imide bond.

2. The secondary battery packaging material according to claim 1,
wherein the first polyolefin is contained in the adhesive layer at a ratio of from not less than 20 wt % to not more than 80 wt %; and the second polyolefin is contained in the adhesive layer at a ratio of from not less than 20 wt % to not more than 80 wt %.

3. The secondary battery packaging material according to claim 1,
wherein the first polyolefin is any one of polybutenes, butene-ethylene copolymers, butene-propylene copolymers, butene-ethylene-propylene copolymers, and butene-α-olefin copolymers polymerized with one, or two or more of unsaturated carboxylic acids, anhydrides of the unsaturated carboxylic acids, and (meth) acrylic acid esters.

4. The secondary battery packaging material according to claim 1,
wherein the adhesive layer has a thickness of from not less than 1 μm to not more than 5 μm.

5. The secondary battery packaging material according to claim 1,
wherein the heat-sealable resin layer has a thickness of from not less than 20 μm to not more than 90 μm.

6. A secondary battery comprising the secondary battery packaging material according to claim 1.

7. A method for manufacturing a secondary battery packaging material of claim 1, which comprises at least a metal foil layer, an anti-corrosion treatment layer, an adhesive layer, and a heat-sealable resin layer laminated in this order on a first surface of a substrate layer, comprising:
applying a coating liquid onto the anti-corrosion treatment layer to form the adhesive layer, the coating liquid containing two or more polyolefins of which a first polyolefin with the highest melting temperature of the two or more polyolefins has a melting temperature of from not less than 90° C. to not more than 160° C., and a second polyolefin with the lowest melting temperature of the two or more olefins has a melting temperature of from not less than 60° C. to not more than 90° C., wherein the first polyolefin and the second polyolefin contained in the adhesive layer are cross-linked by an imide bond, and
performing dry lamination after forming the adhesive layer to form the heat-sealable resin layer on the adhesive layer, the dry lamination being performed using a heat-sealable resin containing a third polyolefin having a melting temperature of from not less than 90° C.-to not more than 160° C., at a temperature of equal to or more than the melting temperature of the second polyolefin but less than the melting temperature of the first polyolefin that is less than the melting temperature of the third polyolefin.

8. The method for manufacturing a secondary battery packaging material according to claim 7, further comprising the step of performing aging treatment after forming the heat-sealable resin layer, the aging treatment being performed at a temperature of from not less than 20° C. to not more than 100° C., targeting the anti-corrosion treatment layer, the adhesive layer, and the heat-sealable resin layer.

9. The method for manufacturing a secondary battery packaging material according to claim 7, further comprising heating the anti-corrosion treatment layer, the adhesive layer, and the heat-sealable resin layer after forming the heat-sealable resin layer, the heating being performed at a temperature ranging from not less than the melting temperature of the first polyolefin or not less than the melting temperature of the third polyolefin to not more than 160° C., followed by cooling to a temperature of less than a crystal lization temperature of the adhesive layer that is less than a crystallization temperature of the heat-sealable resin layer.

10. The method for manufacturing a secondary battery packaging material according to claim 8, further comprising heating the anti-corrosion treatment layer, the adhesive layer, and the heat-sealable resin layer after aging the anti-corrosion treatment layer, the adhesive layer, and the heat-sealable resin layer, the heating being performed at a temperature ranging from not less than the melting temperature of the first polyolefin or not less than the melting temperature of the third polyolefin to not more than 160° C., followed by cooling to a temperature of less than a crystallization temperature of the adhesive that is less than a crystallization temperature of the heat-sealable resin layer.

11. The method for manufacturing a secondary battery packaging material according to claim 10, further comprising performing aging treatment after heating and cooling the anti-corrosion treatment layer, the adhesive layer, and the heat-sealable resin layer, the aging treatment being performed at a temperature of from not less than 20° C. to not more than 100° C., targeting the anti-corrosion treatment layer, the adhesive layer, and the heat-sealable resin layer.

12. A secondary battery packaging material comprising:
a substrate layer having a first surface and the substrate layer containing polyester, polyamide, or a combination thereof;
a metal foil layer laminated on the first surface of the substrate layer;
an anti-corrosion treatment layer laminated on the metal foil layer;
an adhesive layer laminated on the anti-corrosion treatment layer and containing two or more polyolefins; and
a heat-sealable resin layer laminated on the adhesive layer,
wherein of the two or more of polyolefins of the adhesive layer, a first polyolefin having the highest melting temperature of the two or more olefins with a melting temperature of from not less than 90° C. to not more than 160° C.; and a second polyolefin having the lowest melting temperature of the two or more olefins with a melting temperature of from not less than 60° C. to not more than 90° C. and
wherein the first polyolefin and the second polyolefin contained in the adhesive layer are cross-linked by an imide bond.

* * * * *